(12) United States Patent
Yang et al.

(10) Patent No.: US 12,045,399 B1
(45) Date of Patent: Jul. 23, 2024

(54) SENSING CIRCUIT AND CONTROL METHOD THEREOF

(71) Applicant: NOVATEK Microelectronics Corp., Hsin-Chu (TW)

(72) Inventors: Hsin-Hong Yang, Yunlin County (TW); Yen-Cheng Cheng, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/105,884

(22) Filed: Feb. 6, 2023

(51) Int. Cl.
G06F 3/041 (2006.01)
G06F 3/0354 (2013.01)

(52) U.S. Cl.
CPC ........ G06F 3/03545 (2013.01); G06F 3/0412 (2013.01)

(58) Field of Classification Search
CPC .... G06F 3/03545; G06F 3/0412; G06F 3/044; G06F 3/041
See application file for complete search history.

(56) References Cited

U.S. PATENT DOCUMENTS

| | | | | |
|---|---|---|---|---|
| 2012/0068953 A1* | 3/2012 | Chang | ............... | G01R 27/2605 345/173 |
| 2016/0202785 A1* | 7/2016 | Bell | ............... | G06F 3/0446 345/173 |
| 2016/0378221 A1* | 12/2016 | Solven | ............... | G06F 3/044 345/174 |
| 2018/0188879 A1* | 7/2018 | Lin | ............... | G06F 3/0418 |
| 2019/0171319 A1* | 6/2019 | Aoki | ............... | G06F 3/044 |

* cited by examiner

Primary Examiner — Md Saiful A Siddiqui
(74) Attorney, Agent, or Firm — Winston Hsu (57) ABSTRACT

A sensing circuit, which is to be coupled to a plurality of sensor pads, includes a plurality of front-end circuits and a plurality of switches. The plurality of switches include first to sixth switches. The first switch is coupled between a first sensor pad and a first front-end circuit. The second switch is coupled between the first sensor pad and the first front-end circuit. The third switch is coupled between a second sensor pad and the first front-end circuit. The fourth switch is coupled between the second sensor pad and a second front-end circuit. The fifth switch is coupled between a third sensor pad and the second front-end circuit. The sixth switch is coupled between the third sensor pad and the second front-end circuit. Wherein, the first sensor pad, the second sensor pad, and the third sensor pad are deployed along a first direction.

16 Claims, 10 Drawing Sheets

|       |       |       |       |       |       |       |       |       |
|-------|-------|-------|-------|-------|-------|-------|-------|-------|
| S19   | S20   | S21   | S22   | S23   | S24   | S25   | S26   | S27   |
| S10   | S11   | S12   | S13   | S14   | S15   | S16   | S17   | S18   |
| S1    | S2    | S3    | S4    | S5    | S6    | S7    | S8    | S9    |

FIG. 1A

| X1_1 X2_1 X3_1 | X1_2 X2_2 X3_2 | X1_3 X2_3 X3_3 |
|----------------|----------------|----------------|

FIG. 1B

| Y1_1 | Y2_1 | Y3_1 | Y4_1 | Y5_1 | Y6_1 | Y7_1 | Y8_1 | Y9_1 |
|------|------|------|------|------|------|------|------|------|
| Y1_2 | Y2_2 | Y3_2 | Y4_2 | Y5_2 | Y6_2 | Y7_2 | Y8_2 | Y9_2 |

SENSING CIRCUIT AND CONTROL METHOD THEREOF

BACKGROUND OF THE INVENTION

1. Field of the Invention

The present invention relates to a sensing circuit, and more particularly, to a sensing circuit for sensing a stylus and a related control method.

2. Description of the Prior Art

In various electronic products such as mobile phones, GPS navigator systems, monitors, laptops and computers, a touch panel is widely utilized as the interface for data communication. The touch panel is a human-based input device, which complies with requirements for hierarchy menu, and possesses keyboard and mouse functions and human-based operations such as handwriting input as well. Particularly, the touch panel is capable of integrating input and output functions in the same interface, e.g. the screen. This feature is far superior to the conventional input devices.

The touch panel is usually deployed with an array of sensor pads for performing touch sensing and/or stylus sensing. In a stylus sensing mode, multiple adjacent sensor pads may be merged to receive sensing signals through the same channel, to form several groups of sensor pads where each group corresponds to one channel. When an active stylus is moving between different groups of sensor pads, the signal intensity may have a drop at the boundaries of the groups. The signal drop may easily cause an error on the determination of the stylus position.

SUMMARY OF THE INVENTION

It is therefore an objective of the present invention to provide a novel sensing circuit for stylus sensing, in order to solve the abovementioned problems.

An embodiment of the present invention discloses a sensing circuit configured to be coupled to a plurality of sensor pads. The sensing circuit includes a plurality of front-end circuits and a plurality of switches. The plurality of switches include a first switch, a second switch, a third switch, a fourth switch, a fifth switch and a sixth switch. The first switch is coupled between a first sensor pad among the plurality of sensor pads and a first front-end circuit among the plurality of front-end circuits. The second switch is coupled between the first sensor pad and the first front-end circuit. The third switch is coupled between a second sensor pad among the plurality of sensor pads and the first front-end circuit. The fourth switch is coupled between the second sensor pad and a second front-end circuit among the plurality of front-end circuits. The fifth switch is coupled between a third sensor pad among the plurality of sensor pads and the second front-end circuit. The sixth switch is coupled between the third sensor pad and the second front-end circuit. Wherein, the first sensor pad, the second sensor pad, and the third sensor pad are deployed along a first direction.

Another embodiment of the present invention discloses a method of controlling a sensing circuit. The method includes steps of: detecting a movement of a stylus on a plurality of sensor pads; and configuring the sensing circuit to be operated in a first pattern or a second pattern in a first scan mode according to the movement of the stylus. Wherein, in the first pattern, a first sensor pad and a second sensor pad among the plurality of sensor pads are commonly coupled to a first front-end circuit, and in the second pattern, the second sensor pad and a third sensor pad among the plurality of sensor pads are commonly coupled to a second front-end circuit. Wherein, the first sensor pad, the second sensor pad and the third sensor pad are deployed along a first direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
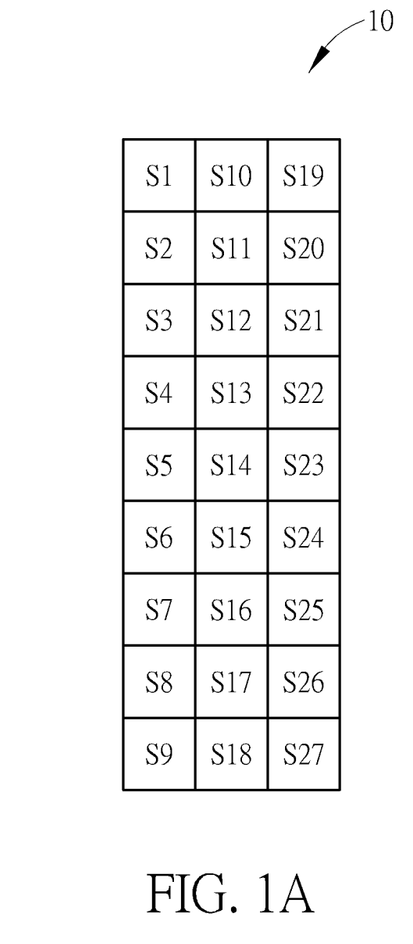
FIG. 1A is a schematic diagram of a touch sensor.

FIG. 1A is a schematic diagram of a touch sensor 10. The touch sensor 10 includes 27 sensor pads S1-S27 deployed as a 9×3 array, and each sensor pad may include a sensing electrode deployed under a sensing area such as a touch panel or screen, for detecting finger touch and/or stylus signals. The touch sensor 10 may be a stand-alone touch sensor or may be implemented on or integrated with a display panel to realize a touch panel.

Note that the implementation of the sensor pads S1-S27 on the touch sensor 10 is merely a simplified example. In fact, there may be more sensor pads included in a touch sensor, and the number of sensor pads and related deployment may be set based on the size of the touch panel. Due to the trend of increasing panel size, a larger processing circuit or sensing circuit is required to process sensing signals received from the sensor pads. In general, the sensing circuit may include a great number of front-end circuits for processing the sensing signals, and each front-end circuit may occupy a considerable circuit area. In order to reduce the area of the sensing circuit, it is preferable to merge several sensor pads so that multiple sensor pads may be commonly coupled to one front-end circuit in the stylus sensing mode. For example, in the case of the touch sensor 10 shown in FIG. 1A, every 3 sensor pad may be commonly coupled to one front-end circuit, and thus only 9 front-end circuits will be required.

In several embodiments, each front-end circuit may be an analog front-end (AFE) circuit implemented in analog domain. The AFE circuit will be taken as examples for illustrating the following embodiments, but those skilled in the art should know that the present invention is not limited thereto.

Figure 1B:
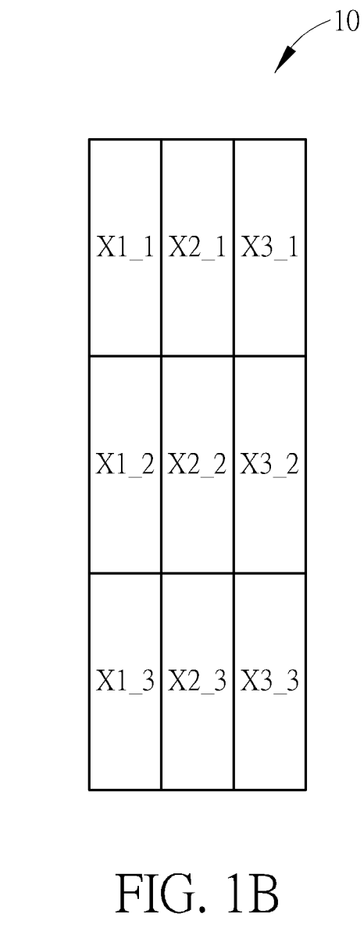
FIG. 1B and FIG. 1C illustrate exemplary methods of merging the sensor pads of the touch sensor.
Figure 1C:
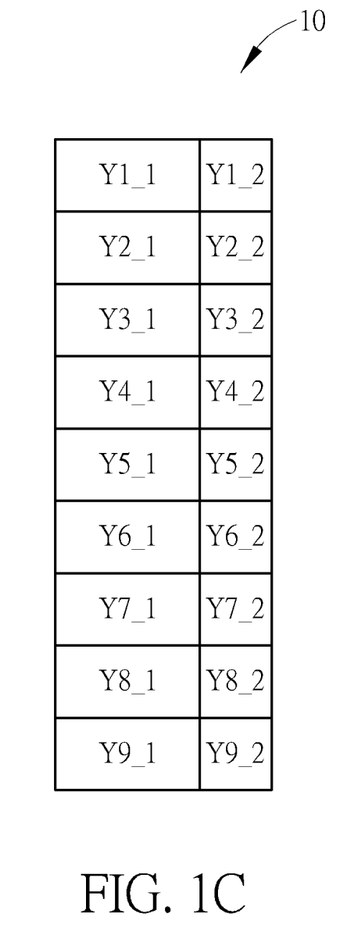

FIGS. 1B and 1C illustrate exemplary methods of merging the sensor pads of the touch sensor 10. In this embodiment, the vertical direction is defined as X-direction, and the horizontal direction is defined as Y-direction. As shown in FIG. 1B, every 3 sensor pads along X-direction is merged as a group and commonly coupled to one AFE circuit, as the groups X1_1-X1_3, X2_1-X2_3 and X3_1-X3_3 of sensor pads. As shown in FIG. 1C, the left 2 columns of sensor pads in each row are merged as a group and commonly coupled to one AFE circuit, and the rightmost column of sensor pad in each row is coupled to the corresponding AFE circuit respectively and independently, to generate the groups Y1_1-Y1_2, Y2_1-Y2_2, . . . , and Y9_1-Y9_2.

Figure 2:
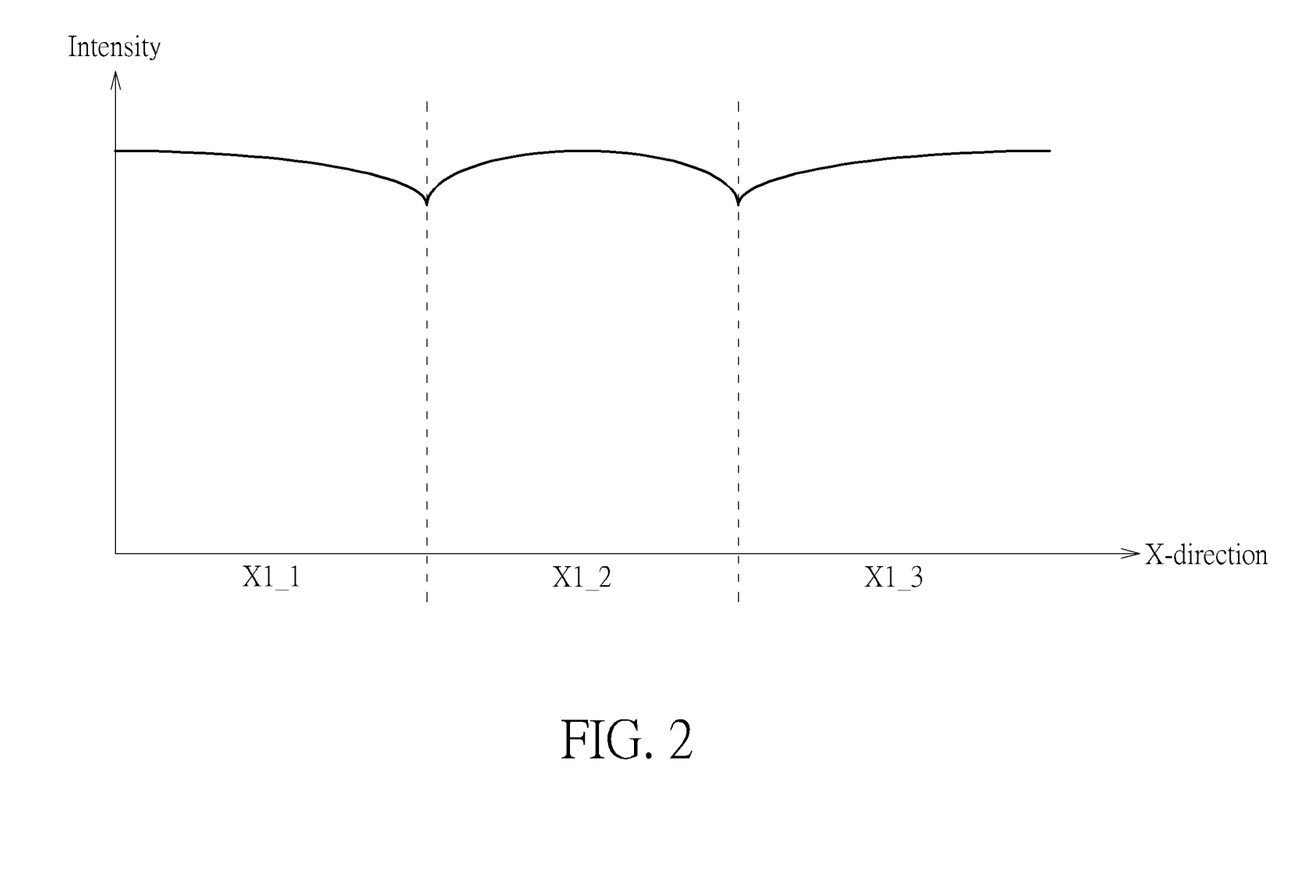
FIG. 2 is a waveform diagram of the signal intensity when the stylus moves across the boundary of different groups of sensor pads.

In the application of stylus sensing, the stylus may be an active stylus, and the sensor pads S1-S27 may sense the stylus by receiving downlink signals generated by the stylus. However, the signal intensity received by the sensor pads S1-S7 may not be uniform due to the merging configurations. More specifically, the signal intensity may decrease when the stylus moves across the boundary of different groups of sensor pads. For example, as shown in FIG. 2, when the stylus moves along X-direction, the signal intensity may have a drop at the boundaries between the groups X1_1 and X1_2 and between the groups X1_2 and X1_3. The signal drop may easily cause an error on the determination of the stylus position.

In the present invention, a method of dynamically adjusting the merging of sensor pads is provided. For example, while detecting that the stylus tends to move across the boundary of two sensor pads currently allocated to different groups, the sensing circuit may immediately change the merging pattern to make these two sensor pads merged to the same group, so that the signal intensity will be consistent when the stylus moves across their boundary.

Figure 3:
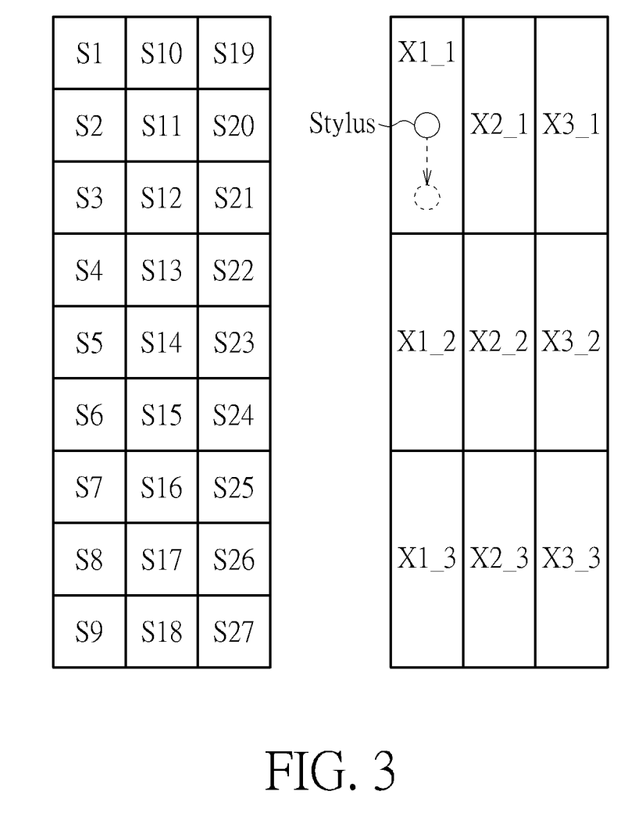
FIG. 3 and FIG. 4 illustrate two X-direction merging patterns.

In an embodiment, the merging of the sensor pads may be controlled by the sensing circuit, which is selectively operated in a first merging pattern or a second merging pattern for different merging configurations according to the movement of the stylus. FIG. 3 illustrates a first X-direction merging pattern, where every 3 sensor pads deployed along X-direction are merged and commonly coupled to one AFE circuit; that is, the sensor pads S1-S27 of the touch sensor 10 are merged to 9 groups X1_1-X3_3.

Figure 4:
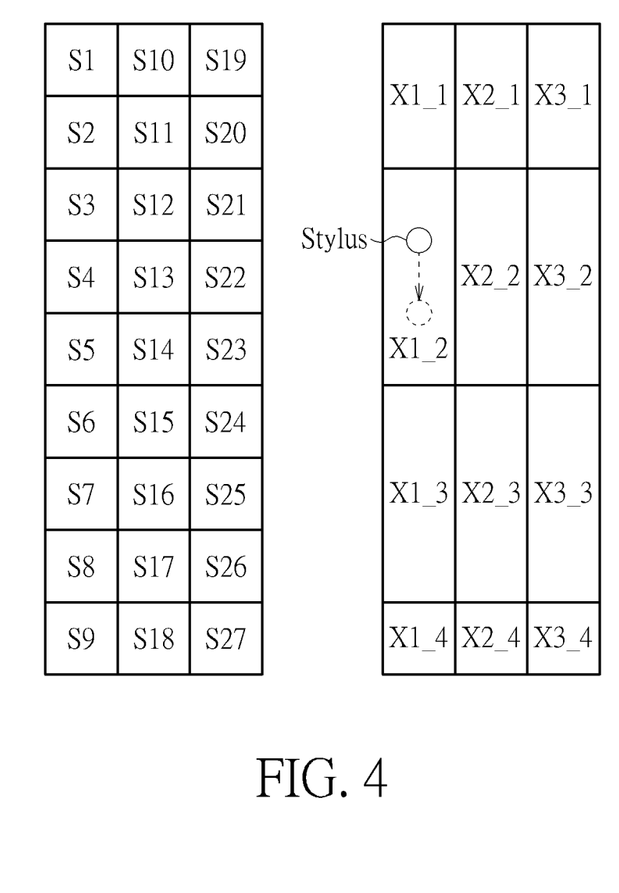

In this embodiment, a stylus may be moving downward from an area of the sensor pad S2 to an area of the sensor pad S3. A control circuit may detect that the stylus keeps moving downward and is approaching an area of the sensor pad S4. It is noted that the sensor pad S3 and the sensor pad S4 belong to different groups in the first X-direction merging pattern, and thus the stylus moving across their boundary will generate an unwanted signal drop. Therefore, the sensing circuit may change to be operated in a second X-direction merging pattern when the stylus is approaching the area of the sensor pad S4. As shown in FIG. 4, the second X-direction merging pattern is that the sensor pads S1 and S2 are merged to the group X1_1, the sensor pads S3-S5 are merged to the group X1_2, the sensor pads S6-S8 are merged to the group X1_3, and the sensor pad S9 itself belongs to the group X1_4. Other two columns of sensor pads S10-S27 are merged in the same manner. Based on the second X-direction merging pattern, the stylus signal will not drop when the stylus in the area of the sensor pad S3 approaches the area of the sensor pad S4 and moves across their boundary.

Figure 5:
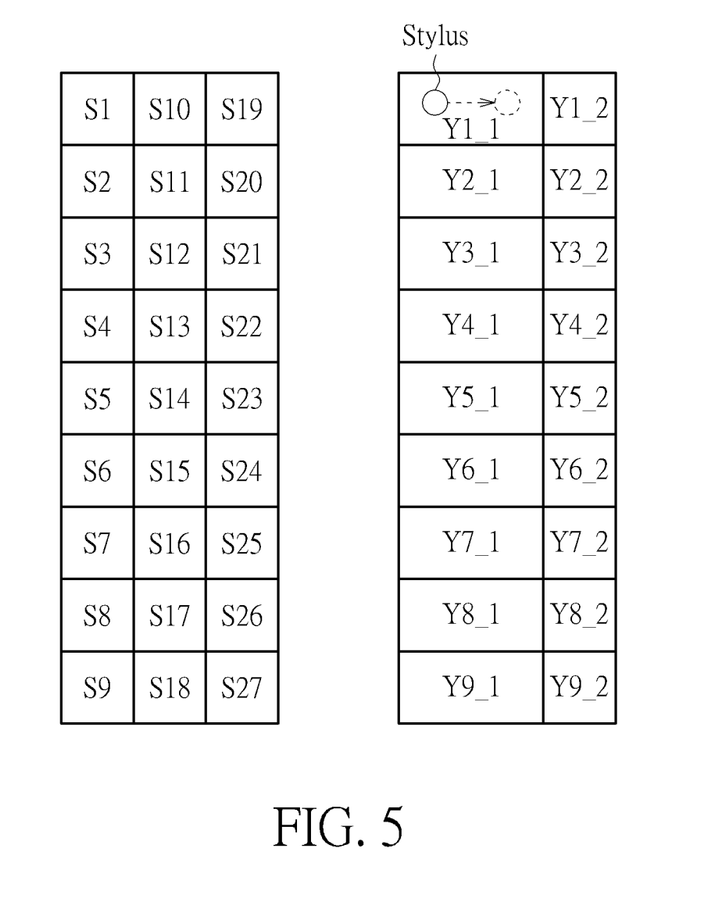
FIG. 5 and FIG. 6 illustrate two Y-direction merging patterns.

In addition, similar merging configurations may also be realized in Y-direction. FIG. 5 illustrates a first Y-direction merging pattern, where the sensor pads S1 and S10 are merged to the group Y1_1 and the sensor pad S19 itself belongs to the group Y1_2, the sensor pads S2 and S11 are merged to the group Y2_1 and the sensor pad S20 itself belongs to the group Y2_2, and so on. In this embodiment, the control circuit may detect the movement of the stylus in Y-direction, to determine that the sensor pads should be merged in the first Y-direction merging pattern or changed to be merged in a second Y-direction merging pattern.

Figure 6:
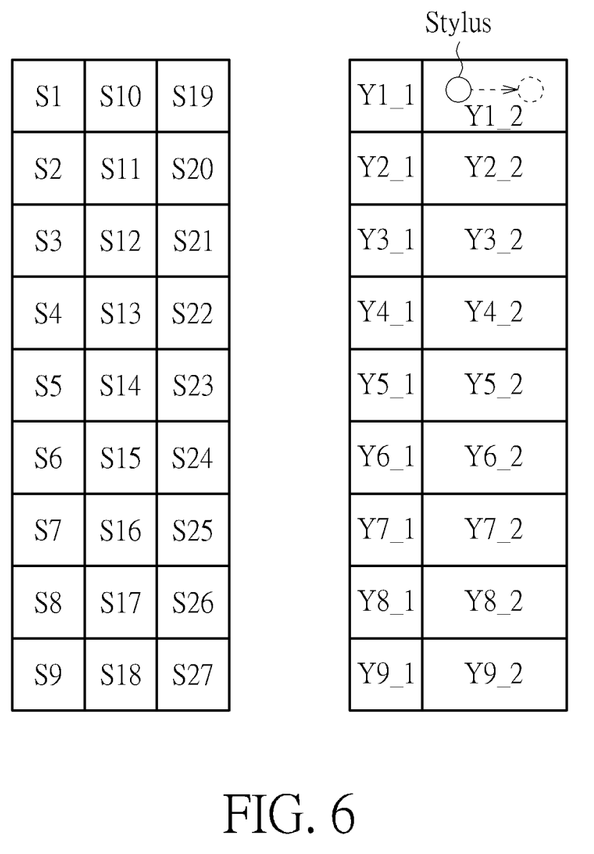

More specifically, when the stylus is moving rightward from an area of the sensor pad S1 to an area of the sensor pad S10, the control circuit may detect whether the stylus is approaching an area of the sensor pad S19, and may control the sensing circuit to be switched to a second Y-direction merging pattern when the stylus is approaching the area of the sensor pad S19. As shown in FIG. 6, in the second Y-direction merging pattern, the sensor pads S10 and S19 are merged (as a group Y1_2) to be commonly coupled to one AFE circuit, while the sensor pad S1 itself belongs to a group Y1_1 and is independently coupled to one AFE circuit.

A touch panel may usually be capable of touch sensing and stylus sensing functions. In the stylus sensing operations, an X-scan mode is applied to detect the X-coordinate of the stylus, and a Y-scan mode is applied to detect the Y-coordinate of the stylus. In the X-scan mode, several sensor pads along X-direction may be merged to detect the stylus signals, and the position of the stylus corresponding to X-direction may be calculated based on the detection result. In the Y-scan mode, several sensor pads along Y-direction may be merged to detect the stylus signals, and the position of the stylus corresponding to Y-direction may be calculated based on the detection result.

Figure 7:
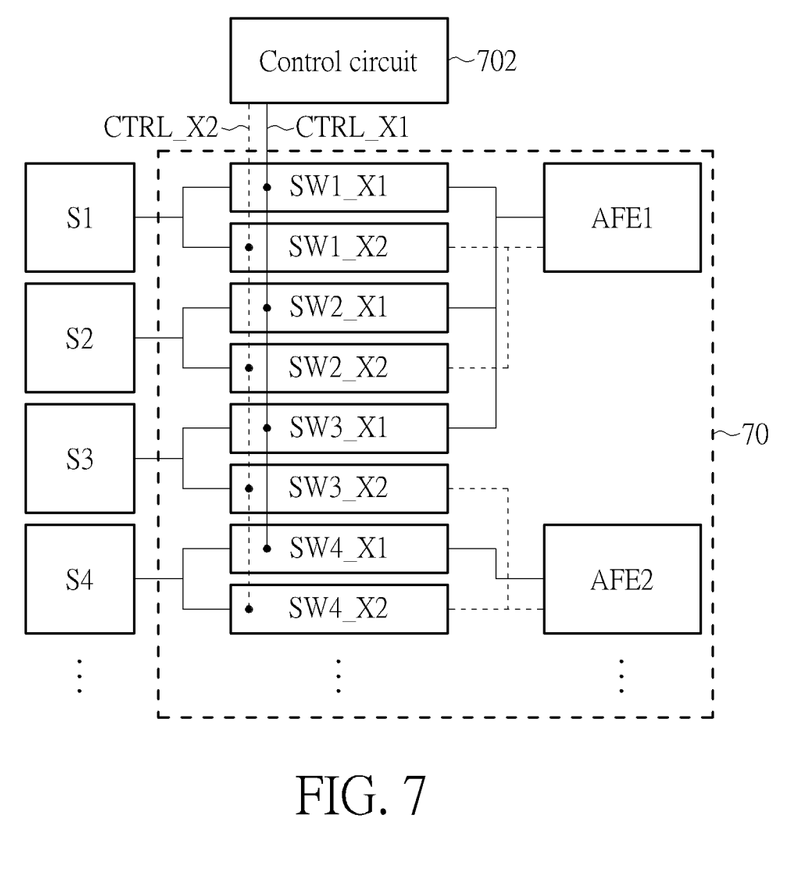
FIG. 7 is a schematic diagram of a sensing circuit according to an embodiment of the present invention.

FIG. 7 is a schematic diagram of a sensing circuit 70 according to an embodiment of the present invention. The sensing circuit 70 illustrates an implementation of switches for X-direction merging, where each sensor pad is controlled by two switches to be coupled to a selected AFE circuit. The statuses of these switches are controlled by a control circuit 702. The control circuit 702 may be a component of the sensing circuit 70, or an independent circuit used for controlling the sensing circuit 70. In an embodiment, the control circuit 702 may be implemented by using a firmware controller, for determining whether each switch should be turned on or off and outputting control signals CTRL_X1 and CTRL_X2 to the switches accordingly. In FIG. 7, the sensor pads S1, S2, S3 and S4 deployed along X-direction and the related sensing circuit 70 are shown, and a skilled person would infer the circuit structure for other sensor pads of the touch panel based on the implementation shown in FIG. 7.

In detail, the sensor pad S1 is controlled by switches SW1_X1 and SW1_X2, where the switch SW1_X1 is coupled between the sensor pad S1 and an AFE circuit AFE1, and the switch SW1_X2 is coupled between the sensor pad S1 and the AFE circuit AFE1. The sensor pad S2 is controlled by switches SW2_X1 and SW2_X2, where the switch SW2_X1 is coupled between the sensor pad S2 and the AFE circuit AFE1, and the switch SW2_X2 is coupled between the sensor pad S2 and the AFE circuit AFE1. The sensor pad S3 is controlled by switches SW3_X1 and SW3_X2, where the switch SW3_X1 is coupled between the sensor pad S3 and the AFE circuit AFE1, and the switch SW3_X2 is coupled between the sensor pad S3 and another AFE circuit AFE2. The sensor pad S4 is controlled by switches SW4_X1 and SW4_X2, where the switch SW4_X1 is coupled between the sensor pad S4 and the AFE circuit AFE2, and the switch SW4_X2 is coupled between the sensor pad S4 and the AFE circuit AFE2. The control circuit 702 may control the switches by outputting the control signals CTRL_X1 and CTRL_X2, where the control signal CTRL_X1 is to control the switches SW1_X1, SW2_X1, SW3_X1 and SW4_X1, and the control signal CTRL_X2 is to control the switches SW1_X2, SW2_X2, SW3_X2 and SW4_X2.

In the first X-direction merging pattern, the switches SW1_X1, SW2_X1, SW3_X1 and SW4_X1 are turned on and the switches SW1_X2, SW2_X2, SW3_X2 and SW4_X2 are turned off. In such a situation, the sensor pads S1-S3 are merged and commonly coupled to the AFE circuit AFE1, and the sensor pad S4 (which may be merged with other sensor pads S5 and S6) is coupled to the AFE circuit AFE2. In the second X-direction merging pattern, the switches SW1_X2, SW2_X2, SW3_X2 and SW4_X2 are turned on and the switches SW1_X1, SW2_X1, SW3_X1 and SW4_X1 are turned off. In such a situation, the sensor pads S1-S2 are merged and commonly coupled to the AFE circuit AFE1, and the sensor pads S3-S4 are merged (which may further be merged with another sensor pad S5) and commonly coupled to the AFE circuit AFE2.

When the sensor pads S1-S3 are merged in the first X-direction merging pattern, the stylus signal may be received by the AFE circuit AFE1 if the stylus is moving on the areas of the sensor pads S1-S3, and this stylus signal may be monitored on any of the sensor pads S1-S3. For example, the stylus signal may be monitored on the sensor pad S even if the stylus is on the area of the sensor pad S2 or S3. Similarly, in the second X-direction merging pattern, the stylus signal may be received by the AFE circuit AFE2 if the stylus is moving on the areas of the sensor pads S3-S5, and this stylus signal may be monitored on any of the sensor pads S3-S5. Based on the movement of the stylus, the stylus signals may be monitored on the sensor pads in different manners under different merging patterns.

In this embodiment, the control circuit 702 may control the sensing circuit 70 to be operated in the first X-direction merging pattern or the second X-direction merging pattern according to the movement of the stylus, to realize the stylus sensing operations in the X-scan mode. In addition, the stylus sensing may also include the Y-scan mode for detecting the Y-coordinate of the stylus, where several sensor pads along Y-direction may be merged and commonly coupled to one AFE circuit. In the Y-scan mode, the sensing circuit may be operated in the first Y-direction merging pattern or the second Y-direction merging pattern based on the circuit structure as described below.

Figure 8:
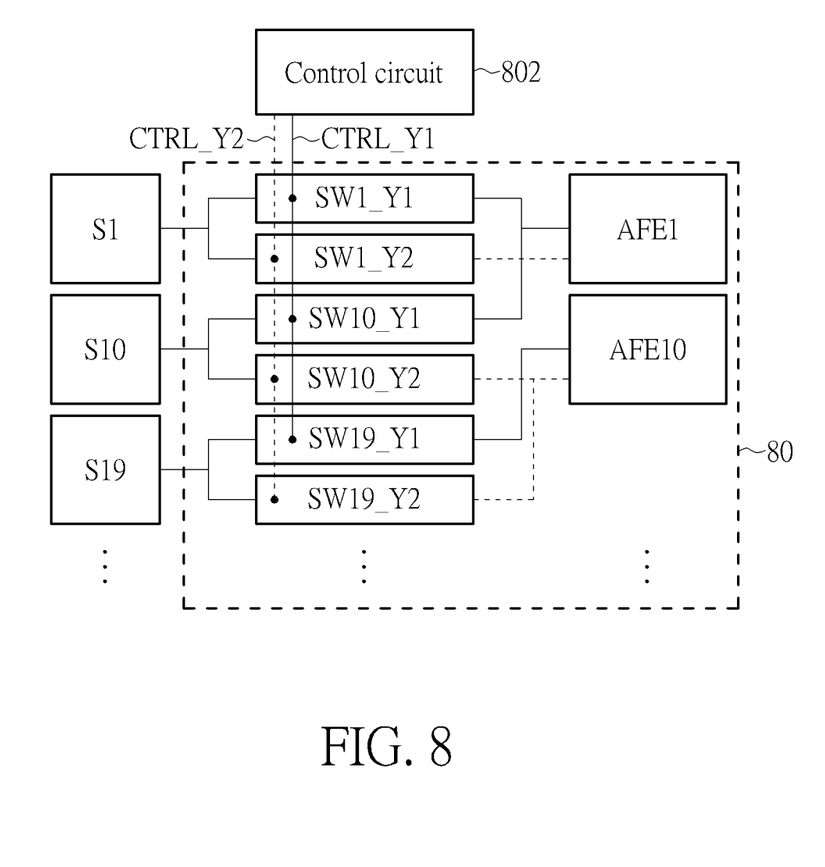
FIG. 8 is a schematic diagram of a sensing circuit according to an embodiment of the present invention.

FIG. 8 is a schematic diagram of a sensing circuit 80 according to an embodiment of the present invention. The sensing circuit 80 illustrates an implementation of switches for Y-direction merging, where each sensor pad is controlled by two switches to be coupled to a selected AFE circuit. The statuses of these switches are controlled by a control circuit 802, which may be the same as or different from the control circuit 702 for X-direction merging control. In FIG. 8, the sensor pads S1, S10 and S19 deployed along Y-direction and the related sensing circuit 80 are shown, and a skilled person would infer the circuit structure for other sensor pads of the touch panel based on the implementation shown in FIG. 8.

In detail, the sensor pad S1 is controlled by switches SW1_Y1 and SW1_Y2, where the switch SW1_Y1 is coupled between the sensor pad S1 and the AFE circuit AFE1, and the switch SW1_Y2 is coupled between the sensor pad S1 and the AFE circuit AFE1. The sensor pad S10 is controlled by switches SW10_Y1 and SW10_Y2, where the switch SW10_Y1 is coupled between the sensor pad S10 and the AFE circuit AFE1, and the switch SW10_Y2 is coupled between the sensor pad S10 and another AFE circuit AFE10. The sensor pad S19 is controlled by switches SW19_Y1 and SW19_Y2, where the switch SW19_Y1 is coupled between the sensor pad S19 and the AFE circuit AFE10, and the switch SW19_Y2 is coupled between the sensor pad S19 and the AFE circuit AFE10. The control circuit 802 may control the switches by outputting two control signals CTRL_Y1 and CTRL_Y2, where the control signal CTRL_Y1 is to control the switches SW1_Y1, SW10_Y1 and SW19_Y1, and the control signal CTRL_Y2 is to control the switches SW1_Y2, SW10_Y2 and SW19_Y2.

In the first Y-direction merging pattern, the switches SW1_Y1, SW10_Y1 and SW19_Y1 are turned on and the switches SW1_Y2, SW10_Y2 and SW19_Y2 are turned off. In such a situation, the sensor pads S1 and S10 are merged and commonly coupled to the AFE circuit AFE1, and the sensor pad S19 is independently coupled to the AFE circuit AFE10. In the second Y-direction merging pattern, the switches SW1_Y2, SW10_Y2 and SW19_Y2 are turned on and the switches SW1_Y1, SW10_Y1 and SW19_Y1 are turned off. In such a situation, the sensor pads S10 and S19 are merged and commonly coupled to the AFE circuit AFE10, and the sensor pad S1 is independently coupled to the AFE circuit AFE1. Therefore, the sensing circuit may be controlled to be operated in the first Y-direction merging pattern when the stylus approaches the boundary between the areas of the sensor pads S1 and S10, and operated in the second Y-direction merging pattern when the stylus approaches the boundary between the areas of the sensor pads S10 and S19, so as to prevent the drop of stylus signals.

In an embodiment, the control circuit is requested to determine the position of the stylus by detecting the X-coordinate and Y-coordinate of the stylus; hence, the X-scan mode and the Y-scan mode may be performed alternately and continuously. In each scan of the X-scan mode, the sensing circuit may be selectively operated in one of the first X-direction merging pattern and the second X-direction merging pattern based on the information of position and/or movement of the stylus determined in the previous scan cycle. In each scan of the Y-scan mode, the sensing circuit may be selectively operated in one of the first Y-direction merging pattern and the second Y-direction merging pattern based on the information of position and/or movement of the stylus determined in the previous scan cycle.

Figure 9:
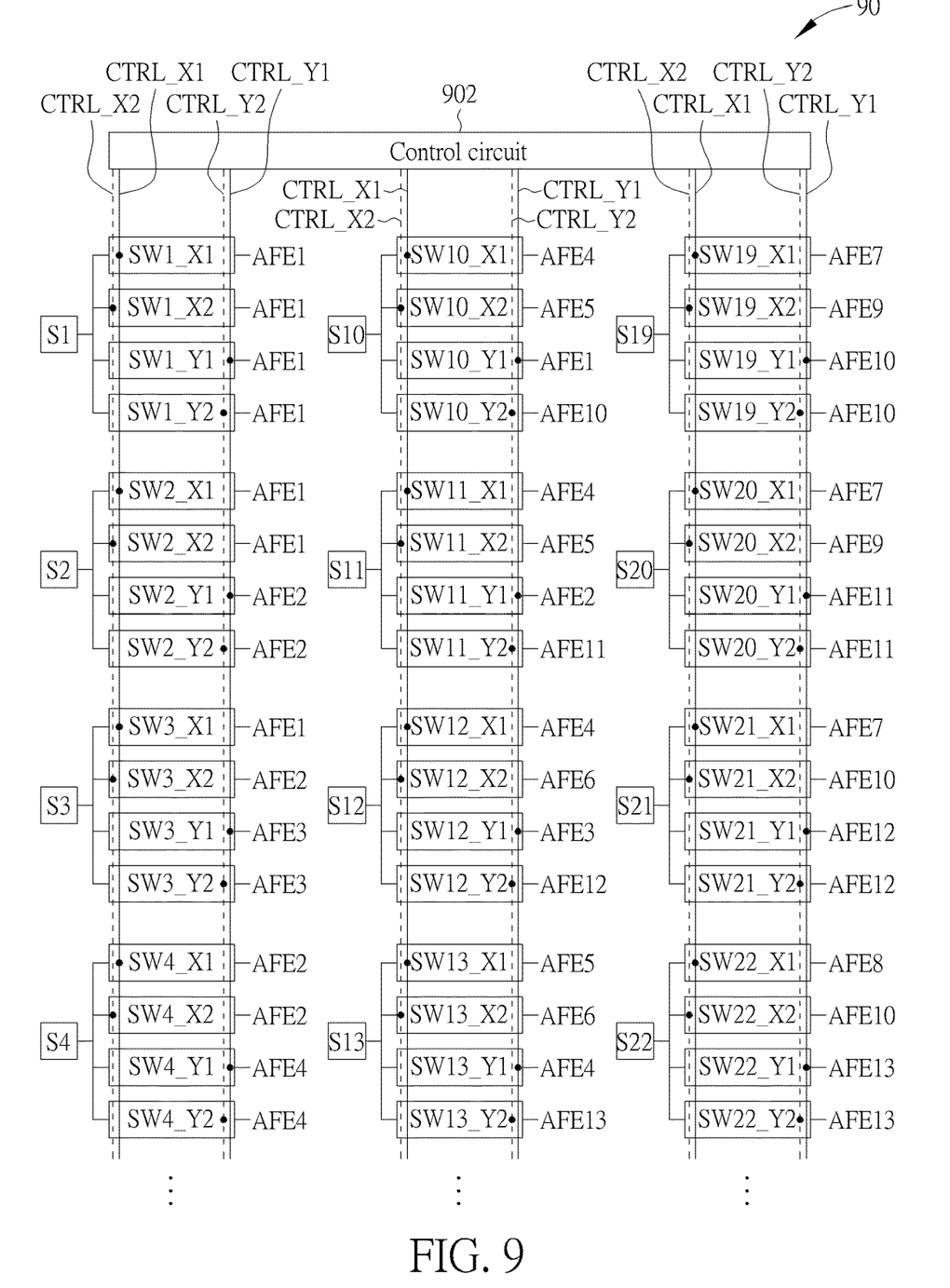
FIG. 9 is a schematic diagram of another sensing circuit according to an embodiment of the present invention.

In this embodiment, if there are two X-direction merging patterns and two Y-direction merging patterns applied to the sensing circuit, each sensor pad may be controlled by 4 switches to be coupled to a selected AFE circuit in each merging pattern. The detailed structure is shown in FIG. 9, where the sensing circuit 90 may be the combination of the structure for the X-scan mode as shown in FIG. 7 and the structure for the Y-scan mode as shown in FIG. 8. FIG. 9 shows a part of the sensing circuit 90, where each of the sensor pads S1-S27 may be coupled to one of the AFE circuits (e.g., AFE1-AFE18) based on the controls of the switches and the control circuit 902, to realize different merging patterns. The detailed descriptions for the sensing circuit 90 and the control circuit 902 may be referred to the above paragraphs, and will not be narrated herein.

Please note that the present invention aims at providing a novel sensing circuit which may change the merging of sensor pads dynamically. Those skilled in the art may make modifications and alterations accordingly. For example, in the above embodiments, there are two merging patterns for X-direction and two merging patterns for Y-direction. In another embodiment, three or more merging patterns for the same direction are also feasible. As long as the merging may be dynamically adjusted to prevent the stylus from moving across the boundaries of different groups of sensor pads, the related implementation should belong to the scope of the present invention.

Figure 10:
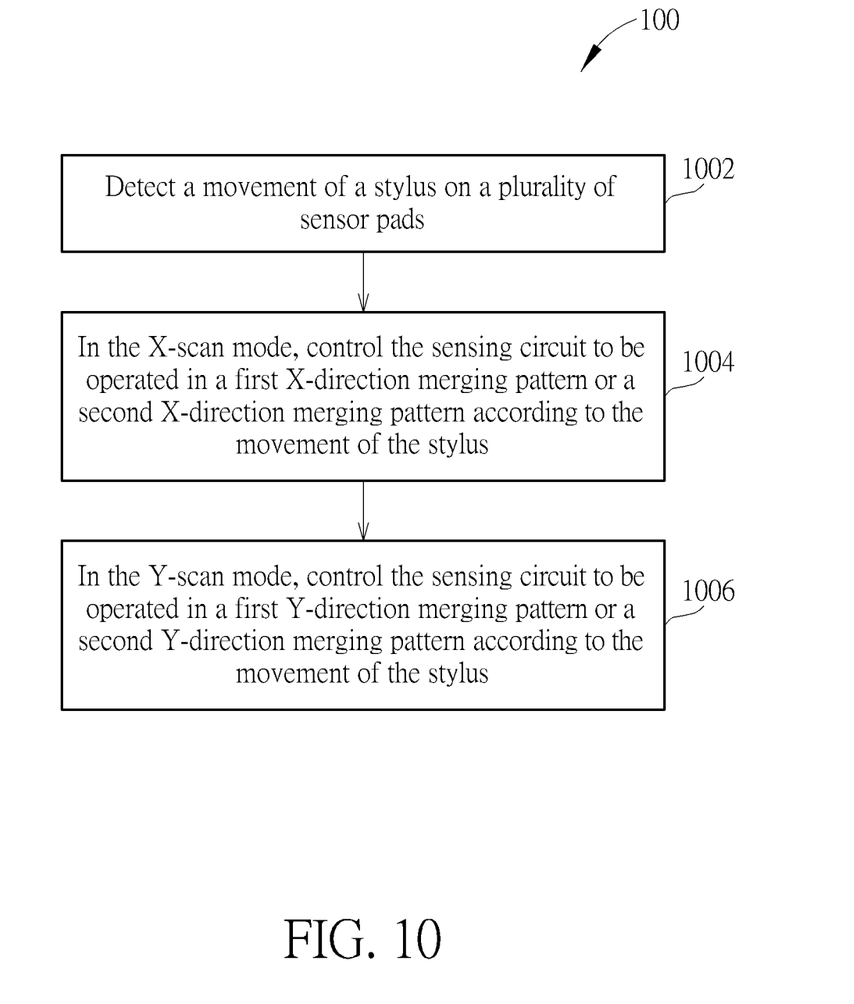
FIG. 10 is a flowchart of a process according to an embodiment of the present invention.

The above operations of the control circuit may be summarized into a process 100, as shown in FIG. 10. The process 100 may be implemented in a control circuit for a sensing circuit which receives stylus signals from sensor pads of a touch sensor, such as the control circuits 702, 802 and 902 as described above. As shown in FIG. 10, the process 100 includes steps of:

Step 1002: Detect a movement of a stylus on a plurality of sensor pads.

Step 1004: In the X-scan mode, control the sensing circuit to be operated in a first X-direction merging pattern or a second X-direction merging pattern according to the movement of the stylus.

Step 1006: In the Y-scan mode, control the sensing circuit to be operated in a first Y-direction merging pattern or a second Y-direction merging pattern according to the movement of the stylus.

The detailed operations and alterations of the process 100 are illustrated in the above paragraphs, and will not be repeated herein.

To sum up, the present invention provides a sensing circuit which may change the merging of sensor pads dynamically. The sensing circuit may include multiple switches, where each switch is coupled between one sensor pad and an AFE circuit. By controlling the switches in the merging configurations, several sensor pads are merged and commonly coupled to the same AFE circuit. In an embodiment, the sensing circuit has a first merging pattern and a second merging pattern for merging sensor pads along the same direction. One of the merging patterns is selected to prevent the stylus from moving across the boundary of two sensor pads belonging to different groups (i.e., not merged together). Therefore, the signal intensity of the stylus will not drop when the stylus moves across the boundary of sensor pads.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensing circuit to be coupled to a plurality of sensor pads, the sensing circuit comprising:
   a plurality of front-end circuits; and
   a plurality of switches, comprising:
   a first switch, coupled between a first sensor pad among the plurality of sensor pads and a first front-end circuit among the plurality of front-end circuits;
   a second switch, coupled between the first sensor pad and the first front-end circuit;
   a third switch, coupled between a second sensor pad among the plurality of sensor pads and the first front-end circuit;
   a fourth switch, coupled between the second sensor pad and a second front-end circuit among the plurality of front-end circuits;
   a fifth switch, coupled between a third sensor pad among the plurality of sensor pads and the second front-end circuit; and
   a sixth switch, coupled between the third sensor pad and the second front-end circuit;
   wherein the first sensor pad, the second sensor pad, and the third sensor pad are deployed along a first direction.

2. The sensing circuit of claim 1, wherein the first switch, the third switch and the fifth switch are turned on in a first pattern, and the second switch, the fourth switch and the sixth switch are turned on in a second pattern.

3. The sensing circuit of claim 1, wherein the first front-end circuit is coupled to the first sensor pad and the second sensor pad and the second front-end circuit is coupled to the third sensor pad in a first pattern, and the first front-end circuit is coupled to the first sensor pad and the second front-end circuit is coupled to the second sensor pad and the third sensor pad in a second pattern.

4. The sensing circuit of claim 3, wherein the sensing circuit is selectively operated in the first pattern or the second pattern according to a movement of a stylus.

5. The sensing circuit of claim 4, wherein the stylus is an active stylus.

6. The sensing circuit of claim 3, wherein the sensing circuit is operated in the second pattern when a stylus is in an area of the second sensor pad and approaching an area of the third sensor pad.

7. The sensing circuit of claim 1, further comprising:
   a seventh switch, coupled between the first sensor pad and a third front-end circuit among the plurality of front-end circuits;
   an eighth switch, coupled between the first sensor pad and the third front-end circuit;
   a ninth switch, coupled between a fourth sensor pad among the plurality of sensor pads and the third front-end circuit;
   a tenth switch, coupled between the fourth sensor pad and a fourth front-end circuit among the plurality of front-end circuits;
   an eleventh switch, coupled between a fifth sensor pad among the plurality of sensor pads and the fourth front-end circuit; and
   a twelfth switch, coupled between the fifth sensor pad and the fourth front-end circuit.

8. The sensing circuit of claim 7, wherein the first sensor pad, the fourth sensor pad and the fifth sensor pad are deployed along a second direction.

9. A method of controlling a sensing circuit, comprising:
   detecting a movement of a stylus on a plurality of sensor pads; and
   controlling the sensing circuit to be operated in a first merging pattern or a second merging pattern in a first scan mode according to the movement of the stylus;
   wherein in the first merging pattern, a first sensor pad and a second sensor pad among the plurality of sensor pads are commonly coupled to a first front-end circuit, and in the second merging pattern different from the first merging pattern, the second sensor pad and a third sensor pad among the plurality of sensor pads are commonly coupled to a second front-end circuit;
   wherein the first sensor pad, the second sensor pad and the third sensor pad are deployed along a first direction;
   wherein the first merging pattern and the second merging pattern do not exist simultaneously.

10. The method of claim 9, wherein the sensing circuit is operated in the second merging pattern when the stylus is in an area of the second sensor pad and approaching an area of the third sensor pad.

11. The method of claim 9, wherein the first scan mode is used to detect a position of the stylus corresponding to the first direction.

12. The method of claim 9, further comprising:
controlling the sensing circuit to be operated in a third merging pattern or a fourth merging pattern in a second scan mode according to the movement of the stylus.

13. The method of claim 12, wherein in the third merging pattern, the first sensor pad and a fourth sensor pad among the plurality of sensor pads are commonly coupled to a third front-end circuit, and in the fourth merging pattern, the fourth sensor pad and a fifth sensor pad among the plurality of sensor pads are commonly coupled to a fourth front-end circuit.

14. The method of claim 13, wherein the first sensor pad, the fourth sensor pad and the fifth sensor pad are deployed along a second direction.

15. The method of claim 14, wherein the second scan mode is used to detect a position of the stylus corresponding to the second direction.

16. The method of claim 9, wherein the stylus is an active stylus.

\* \* \* \* \*